United States Patent Office 3,553,691
Patented Jan. 5, 1971

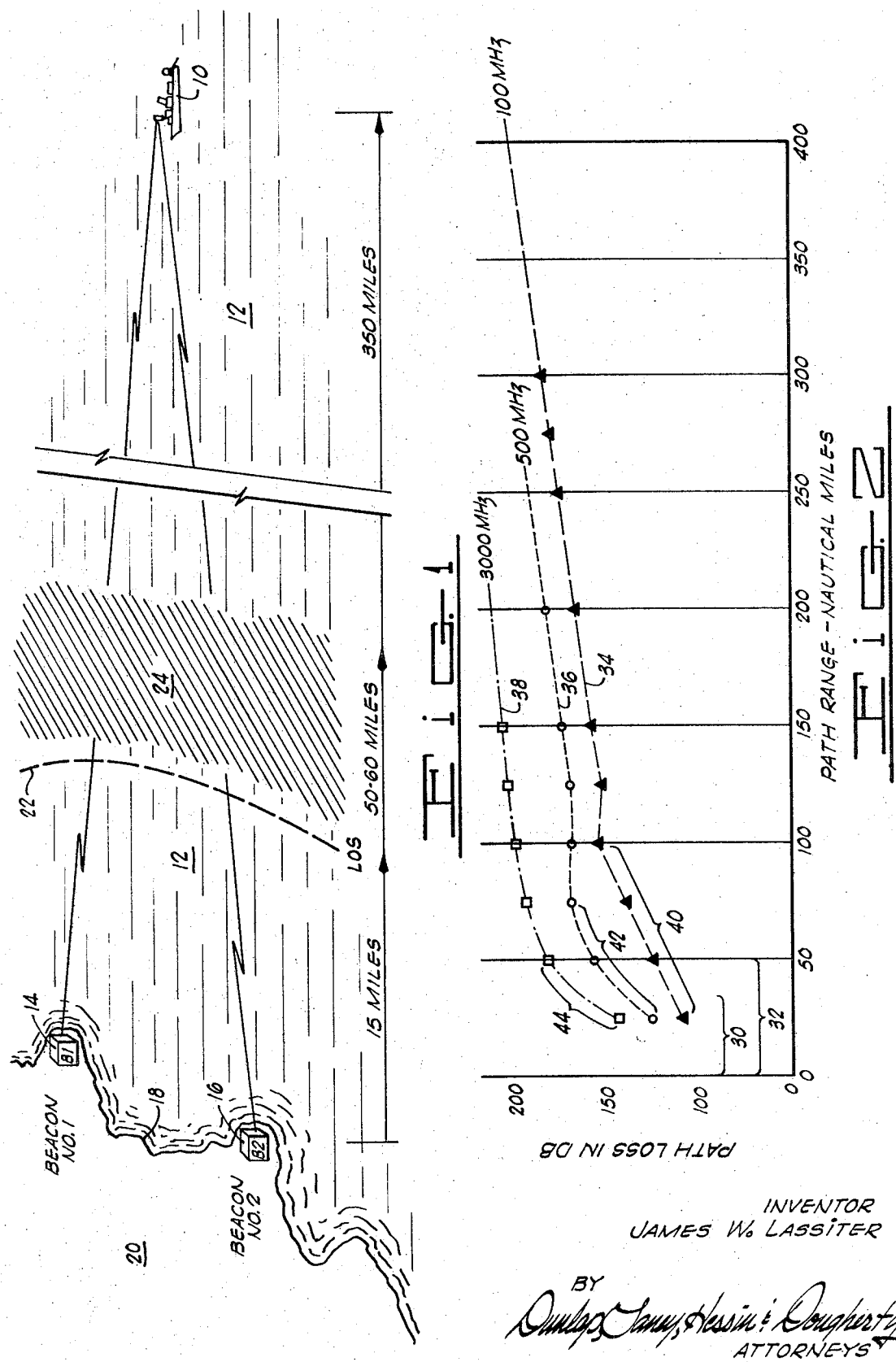

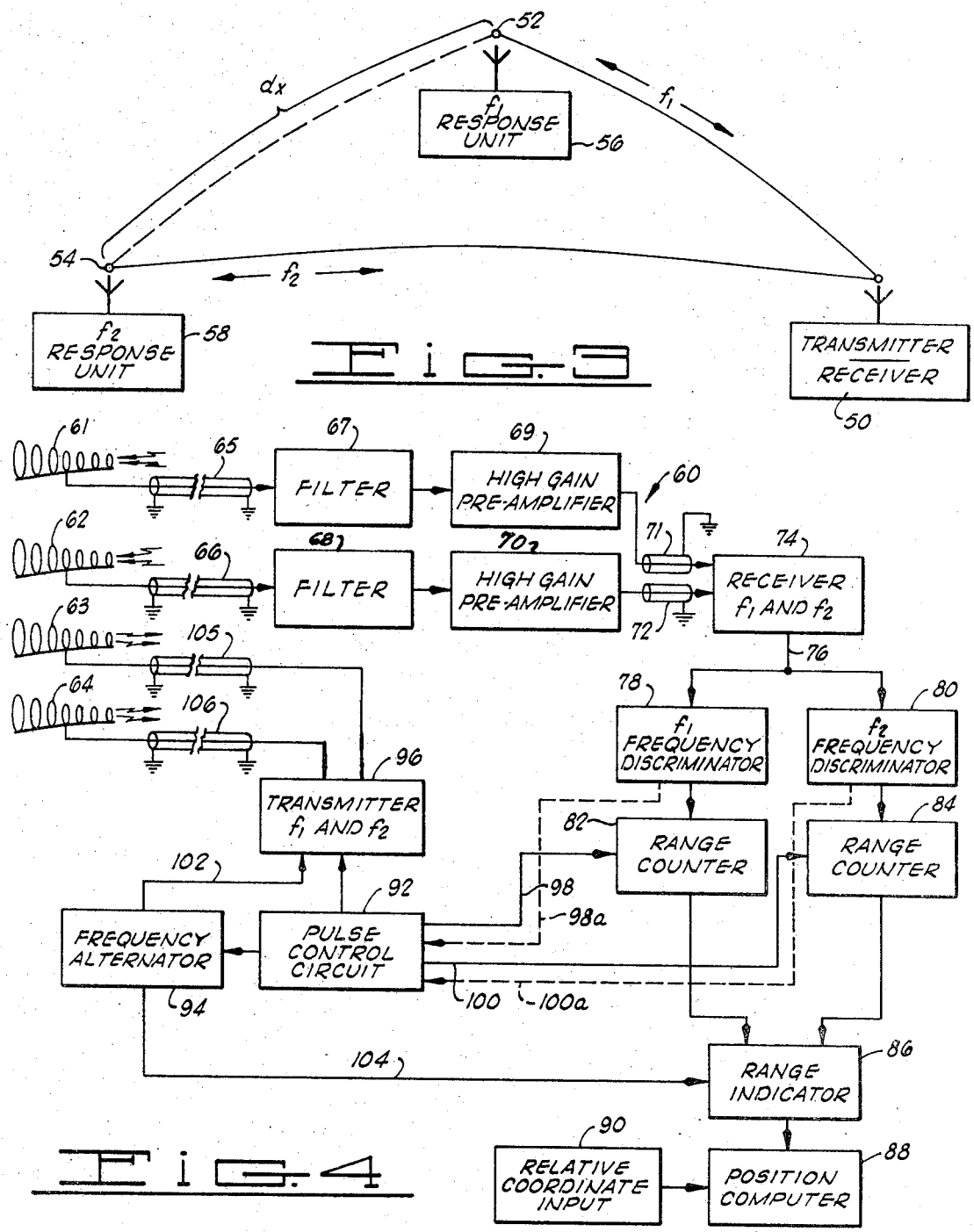

3,553,691
LONG RANGE POSITION DETERMINATION SYSTEM
James W. Lassiter, 3415 Greentree Drive,
Falls Church, Va. 22041
Filed Aug. 14, 1969, Ser. No. 849,953
Int. Cl. G01s 9/06
U.S. Cl. 343—15                  3 Claims

ABSTRACT OF THE DISCLOSURE

A system for performing radio energy triangulation relative to two known points to maintain an accurate position of a third point or surface body which may be located at varying transhorizon distances from the first and second points. The system may utilize electromagnetic radiation in the mid-VHF range with transmission and reception over distances which are several times greater than the usual line of sight radio energy ranges, such capability being enabled due to the discovery of a unique electromagnetic wave propagation phenomena.

BACKGROUND OF THE INVENTION

(1) Field of the invention

The invention relates generally to long range surface position determination and, more particularly, but not by way of limitation, it relates to an improved method and radio ranging triangulation apparatus which is capable of reliable usage over surface ranges increased by as much as four and five times the normally experienced line of sight radiation limitations.

(2) Description of the prior art

The prior art includes several types of equipment which are similar to that employed in the present invention; however, these prior systems were generally limited to surface-to-air position determination usage. Employ of the prior systems for surface position determination was necessarily limited to line-of-sight radiation ranges of from fifteen to thirty miles, this depending upon the height of the associated transmitting and receiving antennae. Some of such prior systems necessarily employ electromagnetic radiation frequency in the VOF and higher ranges since the navigation and ranging utilization requires finite radiated energy capable of substantial directional focusing and power concentration. The necessity for using such frequencies as VHF and higher also brought about the limitations as to range capability, i.e. the effective distance of reliable energy reception.

One well-known form of such prior type of equipment was known as the Shoran system as taught during World War II for use in surface-to-air applications. In such equipment, transponder beacons were disposed at first and second known surface points for coaction with the third point, an aircraft flying at considerable ranges and altitudes. The Shoran-type system was capable of great ranges in this usage since the third point, or interrogating aircraft, could be as much as two hundred miles away and at 20,000 feet altitude while still retaining a line-of-sight disposition from the surface beacons. It is obvious then, that for surface-to-surface applications, the equipment would run into severe limitations as to range capability, e.g. one hundred megacycle (mHz.) wave energy could make reliable communication only to the visual horizon plus a little more, i.e., about twenty miles, so that usage for surface position determination was necessarily limited to short ranges. Considering the positioning of the beacon points at transmission stations of say one hundred feet and the surface vessel antenna positioned at one hundred feet, the maximum range of effective position determination is still limited to about 25 to 30 miles. Even at that, the means for situating the transponding beacons at desirable elevations is not readily available during such as an off-shore geophysical sounding operation which should progress through various related coordinates along a shoreline.

SUMMARY OF THE INVENTION

The present invention contemplates a system which enables surface position determination at ranges which are increased many times over the range capability of prior known systems. In a more limited aspect, the invention consists of the utilization of a triangulation ranging system which consists of an interrogating transmitter-receiver located on a moving vessel, and first and second responding beacons located at known points, and the electromagnetic radiation lies within a frequency range which enables operation in adherence to newly discovered propagation characteristics which increase surface ranging capability by many times. The present invention, makes effective utilization of a discovery that there is a portion of propagated radio energy which is capable of organized passage to or reflection from target stations located several hundred miles over the horizon. The propagated energy necessarily bends around the curvature of the earth without great unpredictable increases in travel time or disorganization of any pulse character such that highly accurate position determination at relatively great surface ranges is accomplished.

Therefore, it is an object of the present invention to provide a surface position determination system which is capable of reliable usage up to surface ranges on the order of three hundred and fifty miles, more or less.

It is also an object of the present invention to provide such long range system which is economical and reliable for use in such as position coordinating apparatus onboard geophysical mapping ships.

Finally, it is an object of the present invention to provide navigation apparatus, utilizing a discovery relating to radiation behavior along the earth's surface, for such as surface ranging to enable accurate position determination at greatly increased ranges.

Other objects and advantages of the invention will be evident from the following detailed description when read in conjunction with the accompanying drawings which illustrate the invention.

BRIEF DESCRIPTION OF THE DRAWING

FIG. 1 is a plan view of a triangulation navigation system shown with increased range capabilities as realized by the present invention;

FIG. 2 is a graph of transmission path loss in decibels versus transmission path range in nautical miles, the curves of the graph serving to illustrate the essentials of propagation phenomena which enable greatly increased surface range coverage;

FIG. 3 illustrates, in block diagram, one form of radio navigation triangulation system which gains advantage through use of the propagation discovery of the present invention; and FIG. 4 is a block diagram of one form of transmitter-receiver equipment which may be utilized in a radio navigation system such as that of FIG. 3.

DETAILED DESCRIPTION OF THE INVENTION

As previously stated, the present invention consists in utilizing a discovery relating to electromagnetic energy surface propagation phenomena to enable very long range position determination and tracking. The unique discovery is defined essentially in terms of the evaluation of transmitted energy as a function of transmission distance along the earth's surface. That is, while it has been generally held, due to an adherence to prior maximum signal-to-noise or power loss requirements in transmission and reception systems, that borrowing any signal reflections the power dissipation proceeded at nearly exponential rate with straight line propagation distance, a very large percentage of propagated energy will not proceed past the radio horizon and there is little or no usable energy following the curvature of the earth. The discovery in point tends to defy such finding.

Prior surface ranging or position determination systems adhering to former propagation standards were, in accordance with the classical concepts, unable to obtain any usable radio transmission and/or reflection from distances which were just slightly over the radio horizon. At surface levels (50 ft. and under), the radio horizon is very nearly the visual horizon of about ten miles. This horizon is extended for radio detection and ranging purposes by a relatively few more miles by proper selection of electromagnetic wave energy frequency and adjustment as to the altitude of transmitting and receiving antenna, whether they be shipboard or land-based.

A prior publication entitled "Transmission Loss Predictions for Tropospheric Communication Circuits," volumes 1 and 2, Technical Note 101, issued May 7, 1965 by the National Bureau of Standards as compiled by P. L. Rice et al., provides extensive analysis and statistics regarding propagation of radio frequency energy in the higher frequency ranges and its value for communications applications. Thus, Technical Note 101 describes a phenomena characteristic in the similar mid-VHF frequency ranges and higher which sees some ordered radio frequency being transmitted into transhorizon areas to provide usable, demodulatable communications transmission. This work ascribes the transmission of such ordered energy to what is termed as a tropospheric scattering effect or forward scattering; that is, a sufficiently large portion of the total energy adheres to the forward scatter theory as opposed to that portion of energy present in randomly varying phase relationship due to diffractions, reflections and other than tropospheric type, refractions, etc. In any event, while such explanations might suffice for application to communication electronics, the similar energy treatment would not have sufficiently ordered wave structure for utilization for highly accurate navigational ranging purposes as required in the present invention.

Thus, while the theory as to transhorizon scatter effect, as set forth in Technical Note 101, may hold true for communications electronics, it would not prove out for extramely accurate long range navigational ranging as effected by the present invention. Such transhorizon electromagnetic energy as that produced through the so-called tropospheric scattering effect would necessarily experience large, randomly varying increases due to indirectly traveling reflections above since the tropospheric active layer may be as high as 10 or 12 miles above the earth's surface. Signals received at any distance would then be so altered to random disposition that the necessary concise pulse derivations as required for navigation ranging would not be present and would have large positive errors of as much as 20-24 miles due to increased travel path.

In accordance with the present invention, it has been discovered that if a transmission and reception system operating at mid VHF and higher can be properly peaked to retain maximum system power (to minimize signal power loss), then there is a component of transhorizon energy which is highly ordered and readily detectable for accurate long range detection and ranging purposes. Without attempting to offer proof of such propagation theory, it should be recognized as valid that such long distance transmitted energy traveling at a constant, known speed must proceed generally along the earth's surface over its entire path in order that it be capable of registering exact pulse time readings. Thus, as will be described, it has been established in practice that extremely exact ranging times are achieved and these, in turn, enable precise computation of position determination at very long ranges which are several times the comparable ranges of prior short range navigation systems, i.e. as utilized for surface usage.

The broad plan view of FIG. 1 illustrates the manner in which previously known navigation systems might compare with the present invention utilizing the novel surface propagation discovery. Thus, for position plotting of a ship 10 operating in a body of water 12, a pair of beacons 14 and 16 are placed at known positions along shore line 18 of an adjacent land mass 20. Position determining radio energy interrogation may then take place between ship 10 and beacons 14 and 16, which are located at known positions and spacing, to enable continual computation of the position of ship 10.

As previously mentioned, the prior art short range navigation systems, e.g. a Shoran-type equipment set up utilized in a surface-to-surface function, could offer only limited tracking range. This equipment operating in the mid VHF range would experience increasing radiation attenuation and unreliability beyond the line-of-sight line (LOS), indicated by dash-line 22, and usage within an uncertain area 24 would depend upon various additional controlling factors. That is, with only sea level elevation of transmitter/receiver components, the line-of-sight line 22 would extend out on the order of fifteen miles with rapid weakening of signal capability there-beyond; however, elevation of transmitting and/or receiving equipment at either of ship 10 or beacons 14 and 16 would tend to extend the radio horizon out into the area 24 such that useful coverage may extend out to as much as forty or fifty miles with judicious selection of system components.

It is quite common for the ship board transmitting and receiving antennas at vessel 10 to be disposed upward on the foremast of vessel 10 at altitudes as high as eighty to one hundred and twenty-five feet. Also if time, coastline and coastal facilities permit, the beacon equipment at beacons 14 and 16 may also be disposed at elevated positions. It can readily be seen then that height adjustments at one or both ends of the transmitter-receiver link can operate to extend the radio horizon or usable range by a considerable amount.

Establishment of the horizon line adheres to the equation $$d_h = 1.07\sqrt{h_1} + 1.07\sqrt{h_2} \qquad (1)$$

where $h_1$ equals the transmitting antenna height in feet, $h_2$ is equal to the receiving antenna height in feet, and $d_h$ is equal to the distance to the radio horizon in nautical miles.

To cite an example then, for the case where an associated beacon is disposed at a one hundred foot level and the ship board transmitter-receiver antenna is disposed one hundred feet above sea level, the maximum possible distance for direct-ray transmission would be $$d_h = [\sqrt{100} + \sqrt{100}][1.07] \qquad (2)$$

and $$d_h = (10 + 10)(10.7) = 21.4 \text{ nautical miles}$$

Thus, the effective horizon line is 21.4 nautical miles which represents the maximum distance of direct-ray energy transmission; and for greater distances, or the equivalent of regions close to but beyond the direct-ray horizon line, various diffraction and turbulence effects must be taken into account.

In employing the present navigation system, the vessel 10 is as much as 350 miles removed from shore line 18 utilizing the same beacon positions, and the system is capable of deriving continual and exact position determination readings from the equipment, as will be further described below. The system of the present invention is able to take advantage of the unique surface propagation phenomena by means of concerted power conservation through all contributing components of the transmitter-receiver link. Such power conservation observances, such as additional effective power realized through high gain, low noise components and transmission lines, enable operation of the associated transmitter and receiver equipments in what may be termed an ultrasensitive region that is capable of responding to transmitted energy adhering to the surface propagation phenomena. It is again reiterated that the discovery contributing to the present invention recognizes that such surface propagation of radio energy, albeit at reduced signal strength, progresses in a highly ordered state suitable for precise navigational ranging.

The data as compiled in the graph of FIG. 2 illustrates the relationship between path loss in db and path range in nautical miles which is illustrative of the propagation phenomena relied upon for operation of the present invention. The path loss in db represents a determination of radiation field strength in terms of the transmitter and receiver power factors from initial transmission through final processing for indication at the receiver. Prior standards as to ranging equipment, e.g. as present in Shoran-type and other known radio frequecy ranging systems, resulted in a path loss in the neighborhood of 120 to 130 decibels. Thus, in keeping with prior radar considerations within line-of-sight limitations, higher radar frequencies generate relatively short propagation path ranges within the area of bracket 30 of FIG. 2. Still other lower ranging frequencies such as the mid-VHF range might extend out to further useful path ranges as indicated by bracket 32. In any event, these restricted path ranges adhere to the classical range considerations as limited by line-of-sight and, despite the operating frequency, the initial db path loss versus path range consideration operates on an initial steep curve indicative of rapidly decreasing radiation strength.

Thus, as to the three curves 34, 36 and 38, as derived for radiation at 100, 500 and 3,000 megahertz respectively, the initial or close-in radiation is rapidly diminishing in accordance with what is, effectively, an exponential curve. At 100 megahertz, the curve portion 40 and the line-of-sight or close-in radiation (not shown) represents such initial curve portion wherein the propagated energy is rapidly diminishing to the point that there is no usable signal return or reception beyond fifty or sixty miles. Similarly, as to the 500 megahertz signal, the curve portion 42 is somewhat steeper to indicate that usable signal energy from the unit propagation medium is much more rapidly deteriorated beyond the conventionally usable power figure. The 3,000 megahertz signal is still more steeply indicative of a deterioration of the conventionally usable energy as evidence by the curve portion 44. It is apparent then that radar systems, operating on the more-or-less standardized 120 to 130 db sensitivities, as usually attainable and generally relied upon, will experience rapid loss of the usable signal as per curve sections 40, 42 and 44.

It is also apparent from the study of FIG. 2, that, for a region of higher recovery capability, i.e. the system being capable of transmitting and receiving at comparable signal-to-noise ratios along a higher path loss in decibels, each of curves 34, 36 and 38 flattens out to enable a much increased range of reception of propagated energy with but little additional useable signal strength in the system link. It can be noted too that there is a direct relationship between frequency and special signal attenuation due to the refractive index of the surface, temperature effects, and other characteristics. Thus, it becomes apparent that the lower frequency, on the order of 100 megahertz, may be the most desirable for providing the precise ranging capability for determination of positions out to as much as 350 or 400 miles with minimal requirements for increase in transmission signal power output and receiver sensitivities. Lower frequencies would probably tend to be of decreased usefulness due to band width limitations, it being desirable to maintain about a 4 mHz. receiver bandwidth in order to enable concise pulse definition, i.e. pulse rise times.

Various structural aspects of the system serve primarily to enable desirable power consideration of the equipment. Adjustments and restrictive limitations to the equipment, both the transmitter and receiver, serve mainly to improve the signal-to-noise capabilities so that the same relative power is recoverable from proportionately smaller amounts of propagated energy, which smaller amounts of energy adhere to the surface propagation dictates as evidenced by the long range portions of curves 34, 36 and 38 of FIG. 2. It is essential then that each component and stage of both the transmitters and receivers of the system be peaked for maximum power handling efficiency, and such adjustments are especially effected as regards the transmitting and receiving antenna gains, signal preamplification gain, maximization of detection sensitivity of the receiver, etc., as will be further described in greater detail.

FIG. 3 illustrates a basic form of high sensitivity navigation ranging system. A transmitter/receiver 50 may be located on board the vessel to be tracked while beacon positions 52 and 54 would be located at some known locations, probably shoreline positions separated by a known distance $d_x$ to provide all the parameters necessary for triangulation determination of the vessel position. The beacon positions 52 and 54 may utilize passive reflectors, e.g. Luneberg lens assemblies, but it is probable that this would cause some ranging limitations, and therefore responding transmitter-receiver assemblies will more often be employed. Thus, positions 52 and 54 will include an $f_1$ response unit 56 and an $f_2$ response unit 58, respectively. The response units 56 and 58 may then be suitably interrogated by a signal output from transmitter/receiver 50; whereupon, they would initiate a return transmission at timed intervals to provide the necessary ranging capability as between the two beacon positions 52 and 54.

Each of the transmitter/receiver 50 and the respective response units 56 and 58 may be units similar to that shown in block diagram in FIG. 4. The equipment of FIG. 4 represents a suitable form of high sensitivity transmitter-receiver unit 60 which effects reception and transmission radiation energy by means of respective antennas 61, 62, 63 and 64. The antennas 61–64 should each be selected from the highly directive, high sensitivity types, e.g. a log periodic loop type of antenna as shown. The number and spacing of loops contributing to the log function may be adjusted in accordance with system exigencies. Thus, receiver antennas 61 and 62 will give a gain of slightly over 15 db, and a similar gain is realized at the transmission end by transmitting antennas 63 and 64.

It should be noted that a single antenna may be utilized for both transmission and reception; however, it is probable that such structure including such as a T–R switch would cause some dilution in total signal strength through the system. In the event that antenna members are employed for both transmission and reception, it would still be desirable to main two antennas, one directed at each of $f_1$ and $f_2$ response units 56 and 58. Such antennas exhibiting the necessary high gain attributes become very directional so that it may be advantageous to focus or direct an antenna at each response unit, as they will generally lay in different directions. It is also possible to employ a single array of antennas which function in synchronous circular scan to transmit and receive both the $f_1$ and $f_2$ radio signals at the proper relative bearing or direction. Such goniometric-type scanning systems are well-known in the related art.

Received energy from receiving antennas 61 and 62 is applied through suitable low loss conduits 65 and 66, e.g. RG8U coaxial cable, for input to respective filters 67 and 68. The filters 67 and 68 may be such as low-loss tubular filters of conventional type and the respective outputs are then applied to respective high gain pre-amplifiers 69 and 70. The high gain pre-amplifiers 69 and 70 may be any of various types of refined design which can provide upwards of 30 db gain while having a signal-to-noise of approximately 2.5 db. The output from pre-amplifiers 69 and 70 are then applied through such as additional lengths of RG8U coaxial cables 71 and 72 for input to a high gain receiver 74.

The receiver 74 is a high gain type tuned for reception of both the $f_1$ and $f_2$ frequencies, whatever, the selected values, and it has been ascertained that a bandwidth handling capacity accommodating 4 megacycles is desirable in order to afford maximum detection sensitivity. It may also be desirable to employ two separate receivers, one for amplification and processing of each of the $f_1$ and $f_2$ counterpart or response signals. Such choice may be made in accordance with prevalent design considerations, the key factor being the maintenance of high sensitivity receiving capability.

Receiver signal is then applied from receiver 74 through input 76 to each of $f_1$ frequency discriminator 78 and an $f_2$ frequency discriminator 80 which enable separation of received pulse energy in accordance with the originating beacon or response stations. Pulse energy received via $f_1$ transmission is then applied to a range counter 82 while pulse energy received from the $f_2$ frequency discriminator 80 is applied to a range counter 84. The respective range counters 82 and 84 will then separately tally the $f_1$ and $f_2$ radiation energy travel times between the respective beacons 52, 54 (FIG. 3), and shipboard transmitter-receiver 50. A known signal processing time delay will occur at each transponder, or $f_1$ and $f_2$ response units 56 and 58, and such internal processing delay times may be determined and calibrated out of the radiation signal travel time tallies for each transmission link of a system.

Output from each of range counters 82 and 84 is then applied to a suitable form of range indicator 86 such as a multi-range, circular sweep type as conventionally employed to indicate triangulation ranges. This information may also be applied to a position computer 88 of well-known type which maintains a continual position data output for the tracked vessel in accordance with the ranges as derived relative to the known beacon positions such as 52 and 54. The position computer 88 may also combine a further coordinate input 90 to maintain complete mapping information relative to an overall or continuing coastal area.

A pulse control circuit 92 provides a time base for the equipment as it provides synchronized output to each of a frequency alternator mechanism 94 and transmitter 96, while also providing range triggers via leads 98 and 100 to respective range counters 82 and 84. The leads 98a and 100a provide optionally selected connections which enable transponder operation of the equipment at each beacon position (52 or 54 of FIG. 3). Thus, outputs from each of $f_1$ and $f_2$ frequency discriminators 78 and 80 are applied via leads 98a and 100a through pulse control circuit 92 to initiate response transmission after some known signal processing delay.

The transmitter 96 may be a well-known type such as that employed in Shoran and Hiran types of position determination systems wherein the transmitter unit is alternated between the two transmission capabilities, i.e. transmitting the $f_1$ frequency, and then, alternately, transmitting the $f_2$ frequency. The frequency alternator 94 provides a control output 102 to transmitter 96 to control transmission alternations as between frequencies $f_1$ and $f_2$, and an additional output from alternator 94 is applied via lead 104 to the range indicator 86. The output from transmitter 96 is then applied through very low-loss coaxial cables 105 and 106 (RG218) for feed-in and energization of the transmitting antennas 63 and 64. The transmitting antennas 63 and 64 are also selected to exhibit antenna gain upwards of 15 db.

While the essential reactive stages of transmitter-receiver unit 60 are generally conventional types of circuits, it must be stressed that each is selected in accordance with the highest standard of power gain and low noise capability, and the interconnection of the various components will also require observance of high gain, low loss principles. To illustrate, the following break-down of sensitivity and noise figures relative to the various components of a system such as that of FIG. 4 are as follows:

|  | Db |
|---|---|
| Transmitter output power | 72.6 |
| Transmitter antenna gain less cable losses | 15.4 |
| Total | 88.0 |
| Maximum receiver sensitivity less noise constant | 93.5 |
| Receiver antenna gain | 17.5 |
| Total | 111.0 |

The standard decibel evaluations are employed in placing standards on the various transmission and reception components. Thus, in terms of voltage gain or attenuation, the decibel adheres to $$db = 20 \log \frac{V_2}{V_1}$$

where $V_1$ is equal to input voltage and $V_2$ is equal to output voltage. In terms of power, the wattage in decibels adheres to the well-known formula $$db_{(watts)} = 10 \log \frac{W_2}{W_1}$$

where $W_1$ is input power and $W_2$ is output power for a stage.

From the above signal data, it can be seen that the total system or loop gain is equal to 88.0 db plus 111.0 db or 199.0 db which, upon comparison to the graph of FIG. 2, will enable very long range transmission and detection, especially at the 100 megahertz range (curve 34). It is precisely this build up of signal handling capability, a combination of efficient power output and high receiver sensitivity at low noise input, which enables highly accurate ranging at extremely long propagation path ranges. Such ranges were heretofore considered totally unattainable with comparable equipment and at such frequencies as the mid-VHF ranges. While the gain factors as set forth above are somewhat idealized, there is still room for some degradation as to certain of the values without appreciably harming the long range position determination capabilities of the system.

The receiver sensitivity or maximum detection sensitivity capability is a standard figure as derived for the "perfect receiver" at four megacycle band width, such "perfect receiver" statistics being set forth in a sensitivity graph of bandwidth versus noise power (dbm) at p. 6 of a technical note entitled "Notes on Microwave Reception," available from Melpar Inc. of Falls Church, Va. The "perfect receiver" sensitivity parameter is a well-known quantity to the skilled artisan, and it serves to aid in proper design of the receiver equipment.

To insure that an adequately high gain system is provided, the preamplifiers such as 69 and 70 (FIG. 4) are included. A preamplifier having the essential characteristics, such as the ability to deliver high gain with low noise at the desired frequency band, may be selected from any of various commercially available types. Also, the selection of the preamplifier should be made such that the bandwidth is appreciably greater than that of the associated receiver unit 74. The preamplifiers 69 and 70 and filters 67 and 68 should be relatively compact and located as close to the antennas 61 and 62 as possible to achieve the best overall performance. It is also contemplated that further refinement of the ranging equipment may include the use of such as a traveling-wave tube in the pre-amplifier stages 69 and 70, such traveling-wave tubes featuring extremely low noise level while having capability of very good gain levels.

In operation, considering usage for position determination of an offshore geophysical mapping vessel, first and second beacon positions are located at some known points on a shoreline, i.e. beacon positions 52 and 54 having respective response units 56 and 58, each of which may be similar to the transmitter-receiver unit 60 of FIG. 4. Still another transmitter-receiver unit 60 will then be located on a vessel at sea. As with prior Shoran and Hiran systems, as well as various other interrogator types of equipment, the same overall equipment is installed at each installation with internal interconnection providing any functional variations. That is, at the beacon positions, respective ones of connections 98a and 100a (FIG. 4) are made to trigger the respective transmitters to transmit counterpart signals in response to reception of either the $f_1$ or $f_2$ frequencies, depending upon the beacon position. At the interrogator end, i.e. on shipboard, alternate connections 98 and 100 are made to provide output from pulse control circuit 92 to the respective range counters 82 and 84 to initiate range count, and the output from pulse control circuit 92 controls frequency alternator 94 to key transmitter 96 at the selected frequency output. Range equivalents between each of transmitter-receiver 50 and response unit 56, and transmitter-receiver 50 and response unit 58, are obtained as a measure of energy travel time, i.e. energy travel time from the shipboard transmitter-receiver 50 (see FIG. 3) to each of the respective $f_1$ and $f_2$ response units 56 and 58 and the travel time of the counterpart signal back to transmitter-receiver 50. Evaluation of the range or travel time differentials relative to the beacon positions 52 and 54 will then enable precise relative position determination of the sea-borne vessel. Any signal delay occurring at transponding equipment is calibrated out of the round-trip travel time in known manner.

With one-way signal path transmitting and receiving parameters such that path loss (as per FIG. 2) on the order of 200 db can be effectively countered, that is to say that the one way path system gain can be determined to be 200 db or greater, then the system will have a capability of receiving valid and reliable pulse signals from as far away as 400 or so miles (see FIG. 2) to yield accurate range information. This has been carried out in practice and, in contrast to systems which were once limited to "line-of-sight" approaches capable of only thirty to forty miles in surface usage, the present system has proven capable of reliable ranging at 300 to 400 miles; this being on a twenty-four hour basis, and having both stations located essentially at sea-level.

The foregoing discloses a novel surface position determination system which finds particular application in the precision navigation field. It is particularly suitable for position determination in conjunction with off-shore geophysical mapping and surveying operations. A system constructed in accordance with the present invention can be finely tuned to operate at a very high level of efficiency as regards signal power, and the enhanced ability to readily distinguish electrical signals enables the system to gain advantage of a unique propagation phenomenon which is particularly useful in such surface navigation applications. Prior research and, finally, satisfactory results of prototype equipments, prove out such radio energy propagation phenomena which does allow a certain portion of mid-VHF energy (and higher frequencies) to follow the contour of the earth's surface in an ordered manner without time loss due to such effects as ducting, tropospheric reflection, and other of the often proffered energy loss accounting factors.

Changes may be made in the combination and arrangement of elements as heretofore set forth in the specification and shown in the drawings; it being understood that changes may be made in the embodiments disclosed without departing from the spirit and scope of the invention.

What is claimed is:

1. A method for navigational position determination relative to known trans-horizon positions which comprises the steps of:

transmitting a radio energy signal having a frequency of one hundred megacycles or higher along a path substantially conforming to the curvature of the earth from a first station, the location of which is to be determined, to a second station spaced from the first station a distance substantially greater than the line-of-sight;

receiving said radio energy signal at the second station;

transmitting from the second station to the first station a counterpart of the first-mentioned signal at a known delay after the receipt of the first-mentioned signal;

receiving the counterpart at the first station;

transmitting a second radio energy signal having the similar frequency of one hundred megacycles or higher along a path substantially conforming to the curvature of the earth from said first station to a third station which is spaced from the first station a distance substantially greater than line-of-sight, and which is spaced by a known distance from said second station;

receiving said second radio energy signal at said third station;

transmitting from the third station to the first station a second counterpart of the second radio energy signal at a known delay after the receipt of the second radio energy signal;

receiving the second counterpart at said first station;

measuring the travel times of said first-mentioned radio energy signal and said first counterpart to derive a first travel time, and said second radio energy signal and said second counterpart to derive a second travel time; and comparing the measured first and second travel times as between the first station and said second station and the first station and said third station, respectively, for triangulation relatuive to the known distance between the second and third stations thereby to derive the relative position of said first station.

2. A method of trans-horizon radio-ranging position determination of surface objects for navigational purposes, the method comprising the steps of:

establishing a first pulse transmission link between said surface object and a first known refrence position, and transmitting selected pulses at mid-VHF and higher frequencies to establish a two-way pulse travel time betwen said surface point and said first reference position at ranges exceeding several multiples of line-of-sight range;

establishing a second pulse transmission link between said surface object and a second known reference position which is disposed at a known range from said first known reference position, and transmitting selected pulses at mid-VHF and higher frequencies to establish a two-way pulse travel time between said surface point and said second reference position at ranges exceeding several multiples of line-of-sight range; and maximizing the gain of each of said transmission links to a point appreciably exceeding normal radar detection sensitivity such that pulse ranging takes place through use of a reduced power component of transmitted mid-VHF and higher energy to enable derivation of pulse travel time for ranges exceeding line-of-sight transmission by a multiple of times.

3. A method for trans-horizon pulse ranging at mid-VHF and higher frequencies between first and second reference surface points which are disposed at appreciably more than line-of-sight distance from a third surface point whose relative distance is to be determined, comprising the steps of:

transmitting said radio energy from said third point toward said first and second points utilizing a high gain antenna and coupling minimizing transmission loss through connection thereto;

receiving said radio energy at said first and second points through a high gain antenna coupled for minimum loss to a high gain pre-amplifier and receiver equipment, and initiating a return transmission of radio energy from each of said first and second points toward said third point, and utilizing a high gain transmitting antenna coupled to receive energy input through minimal loss coupling;

receiving said return radio energy at said third point from each of said first and second points through first and second high gain antennas coupled for minimum loss to a receiver; and peaking the total system gain to enable timing of selected pulse modulation of said radio energy between each of said first and second points and said third point to utilize a reduced power component of the transmitted radio energy which follows the curvature of the earth at reliable linear radio energy travel times such that each of said first and second points may be spaced at a distance greater than seventy-five nautical miles and as much as three hundred nautical miles from said third point.

References Cited

UNITED STATES PATENTS

| | | | |
|---|---|---|---|
| 3,181,155 | 4/1965 | Huckabay et al. | 343—15 |
| 3,434,145 | 3/1969 | Wells | 343—792.5X |

OTHER REFERENCES

K. Bullington: "Characteristics of Beyond-The-Horizon Radio Transmission," Bell Telephone System, Monograph 2494, 1955.

H. Carl: Article in Electrical Communication, vol. 33, No. 2, June 1956, pp. 168—173.

RODNEY D. BENNETT, Primary Examiner

R. E. BERGER, Assistant Examiner

U.S. Cl. X.R.

343—100

PO-1050
(5/69)

UNITED STATES PATENT OFFICE
CERTIFICATE OF CORRECTION

Patent No. 3,553,691  Dated January 5, 1971

Inventor(s) James W. Lassiter

It is certified that error appears in the above-identified patent and that said Letters Patent are hereby corrected as shown below:

Col. 1 line 45 "VOF" should be --VHF"--

Col. 4 line 58 "(10.7)" should be --(1.07)--

Col. 10 line 41 "relatuive" should be --relative--.

Signed and sealed this 23rd day of March 1971.

(SEAL)
Attest:

EDWARD M. FLETCHER, JR.  WILLIAM E. SCHUYLER, JR.
Attesting Officer  Commissioner of Patents